C. J. T. BURCEY.
Alcohol Still.
No. 229,585.  Patented July 6, 1880.
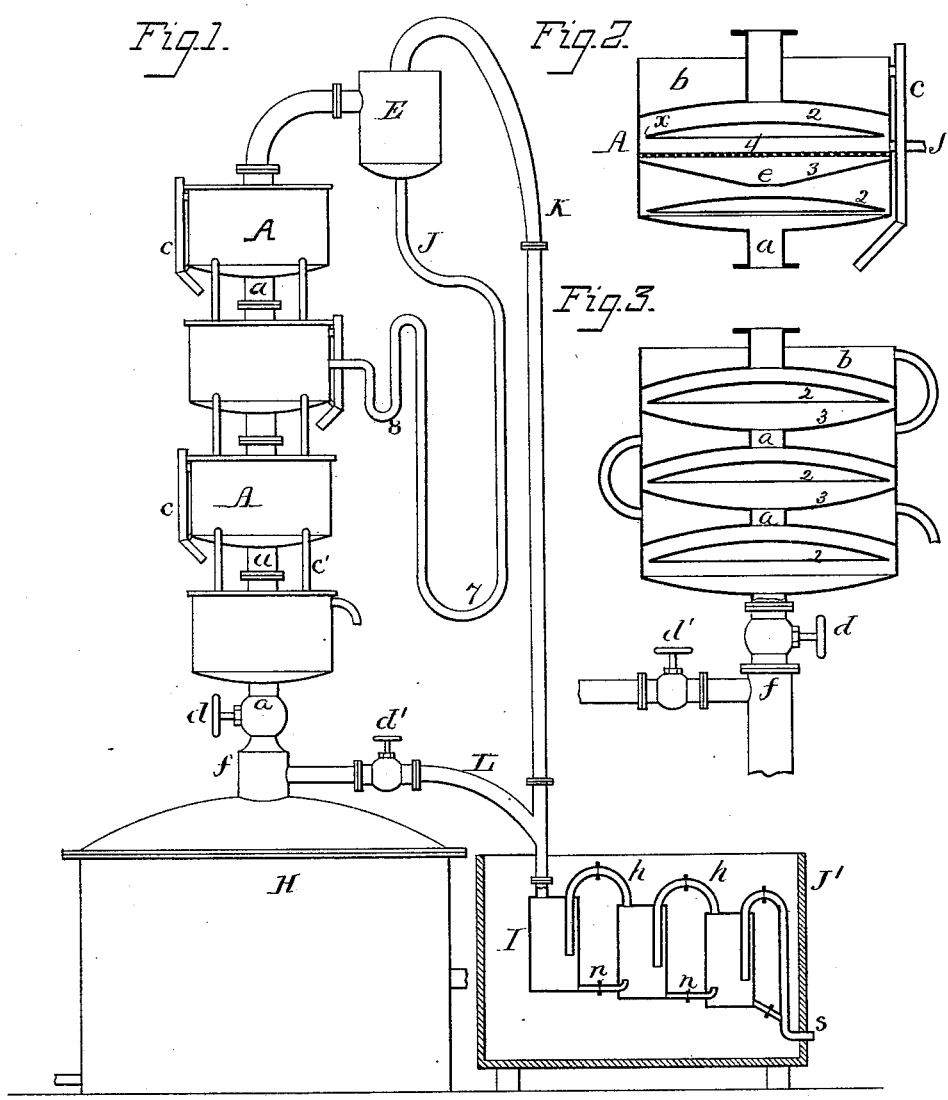

UNITED STATES PATENT OFFICE.

CHARLES J. T. BURCEY, OF BINGHAMTON, NEW YORK.

ALCOHOL-STILL.

SPECIFICATION forming part of Letters Patent No. 229,585, dated July 6, 1880.

Application filed February 18, 1880.

*To all whom it may concern:*

Be it known that I, CHARLES J. T. BURCEY, of Binghamton, Broome county, State of New York, have invented an Improved Apparatus for Distilling and Condensing, of which the following is a specification.

My invention relates to stills, more especially to those for distilling wood-spirit; and it consists in certain devices, fully described hereinafter, whereby to quickly and effectively separate the lighter spirit from the heavier products of distillation, and condense the spirit, all by the use of one apparatus.

In the drawings, forming part of this specification, Figure 1 represents an ordinary still with my improvements; Fig. 2, an enlarged section of one of the chambers; Fig. 3, a modification of part of the apparatus.

H represents the tank or body of an ordinary still, which may be constructed in any suitable manner, my invention relating to those parts to which the vapors flow after being heated, and not to the fluid-receptacle and heating devices.

Above the tank H is one or more cases, A, each being a metal box communicating, through a passage, $a$, with the tank or casing below, and each having a receptacle, $b$, from which an overflow-pipe, $c$, leads to the receptacle above the next lower case. Each case is divided internally by a transverse concave partition, 3, with a central hole, $e$. Above and below the partitions 3 are curved convex plates 2, between each of which and the sides of the case is an annular opening, $x$. A perforated partition, 4, may extend above the partition 3.

The upper case, A, communicates with a vessel, E, from the bottom of which a small pipe, J, bent to form traps 7 8, leads to a point above the partition 4 of one of the cases A.

A pipe, K, extends from the vessel E to the uppermost of a series of condensing-vessels, I, arranged in a water-tank, J', and each communicating with the top of the next lowest through a siphon, $h$, and with the bottom of said vessel through a pipe, $n$. The siphon $h$ of the last vessel joins the outlet-pipe $s$, which extends through the side of the tank J'.

In the tube $f$, between the tank H and the lower case, A, is a valve or cock, $d$, and from the tube, below said cock, a pipe, L, extends to the pipe K, said pipe L being provided with a cock, $d'$.

A constant stream of water flows into the receptacle $b$ of the upper casing, A, and through the overflow-pipe $c$ to the case below, and thence down onto each of the cases, keeping the same cool.

To separate the alcohol from the wood the valve $d'$ is shut and the valve $d$ opened, when the vapors from the tank H pass upward through the column, and in each case A enter through the passage $a$, strike the lower plate 2, are thrown to the outside of the case, then flow back to the opening $e$, thence through the perforated partition 4, then upward to the upper plate 2, which deflects them again to the side of the case, then upward through the passage to the next case.

The contact of the vapors with the cool metal condenses the heavier denser products of distillation, which flow downward and back to the tank, while the light vapors flow upward, each volume of descending fluid, as it reaches the partition 4, being subdivided into small streams, with which the ascending vapors are brought intimately in contact, and which aid in condensing and carrying down all but the lightest vapors, so that the spirit vapor reaches the vessel E in a nearly pure state.

As the concave plates 2 are inverted (the concave side undermost) they tend to somewhat retard the flow of vapors from the center out toward the edge, and thus insure the collection of the heavier particles, permitting only the lighter vapors to flow across the edges and upward. This is the reverse of the result when the plates have the convex side lowermost, in which case the current flows upward without such interruption, and carries many of the heavier particles with it.

Should any of the heavier matters be carried into the vessel E they will there be condensed, the liquid flowing back through the pipe J to the purifying-column, and the purified vapor will flow through the pipe K to the condensing-vessels I, the vapor passing from one to the other through the siphons, and the liquid condensed therein flowing through the pipes $n$ to the outlet. When yellow oily liquid passes from the condenser and shows no alcohol the valve $d$ is closed, the valve $d'$ opened, and the distillation continued to extract the pyroligneous acid and separate it from the tarry matter.

The apparatus thus performs a double duty, and avoids the expense and labor necessary to transfer the liquid remaining in the still after the alcohol is extracted to another apparatus.

Other means may be employed for cooling the cases A, as sprays, jets, &c. Said cases may be enlarged to contain additional partitions and deflectors, or a less number, as in Fig. 3, when all the vessels are in one outside casing.

I do not here claim the construction of the condensers, which may form the subject of a separate application for Letters Patent.

I claim—

1. The combination, with the still H, column of cases A, and condensers I, of the pipe $f$, provided with a cock, $d$, between the still and column, the pipe K, extending from the top of the column to the condensers, and the pipe L, provided with a cock, $d'$, and constituting a communication between the still and condensers, all as specified.

2. The combination, with the still H, condensers I, column A, and pipes $f$ K L, of the vessel E and pipe J, as set forth.

In testimony whereof I have signed my name to this specification in the presence of two subscribing witnesses.

CHARLES JOSEPH THÉOPHILE BURCEY.

Witnesses:
 GEO. C. EDWARDS,
 VALBERT HÉNISSE.